S. FORSTER.
FISHING LINE ATTACHMENT.
APPLICATION FILED SEPT. 23, 1914.
1,153,053.
Patented Sept. 7, 1915.
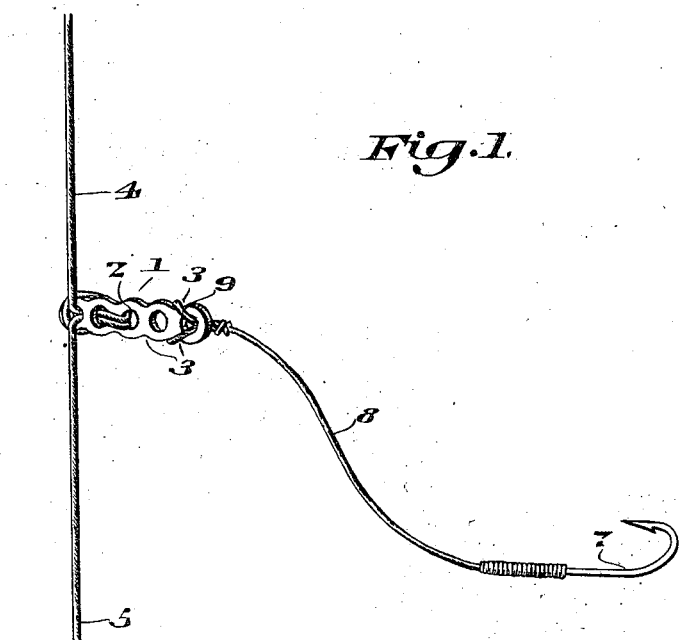
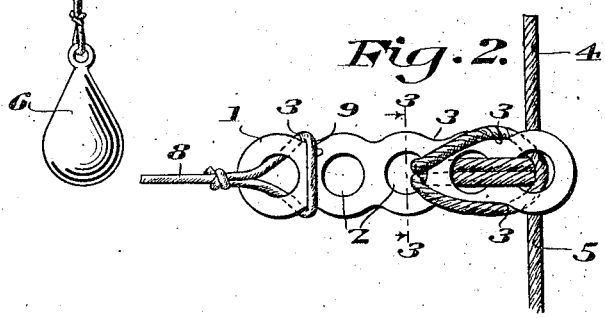
Inventor
Sebastian Forster
Witnesses
By Victor J. Evans
Attorney

UNITED STATES PATENT OFFICE.

SEBASTIAN FORSTER, OF BROOKLYN, NEW YORK.

FISHING-LINE ATTACHMENT.

1,153,053.  Specification of Letters Patent.  Patented Sept. 7, 1915.

Application filed September 23, 1914. Serial No. 863,174.

*To all whom it may concern:*

Be it known that I, SEBASTIAN FORSTER, a citizen of the United States, residing at Brooklyn, in the county of Kings and State of New York, have invented new and useful Improvements in Fishing-Line Attachments, of which the following is a specification.

This invention relates to a fishing line attachment designed especially for use as a connecting member at the submerged end of the line for use as a connecting member between the hook and the line.

One object of the invention is to provide a connecting member to which the line may be adjustably fastened without knotting, and to which the snood of the hook may be fastened independently of the line, in such a manner as to prevent the hook from becoming entangled with the line and to maintain the hook away from the line, the connector serving in this respect as a leader.

A further object of the invention is to provide a connector to which the line may be fastened in a secure manner and disposed with a portion to hold the sinker, and which, in the event of the fish swallowing or gorging the hook so that it can not be extracted will permit of the line being detached without cutting and a new connector and hook applied in a ready and convenient manner.

The invention consists of the features of construction, combination and arrangement of parts herein fully described and claimed, reference being had to the accompanying drawing in which:—

Figure 1 is a perspective view showing the application of the invention. Fig. 2 is a view of the connector and adjacent portion of the line on an enlarged scale. Fig. 3 is a detail cross section on the line 3—3 of Fig. 2.

The connector comprises a substantially oblong rectangular plate 1, provided with a longitudinal series of openings 2, four being shown in the present instance, and a longitudinal series of recesses 3 in each of its longitudinal end edges, said recesses being arranged in transverse alinement and on lines between or alternating with the openings 2.

In the use of the device, the outer end of the line 4 is doubled upon itself, thence passed through the first opening at one end of the plate from one side of the plate to the opposite side thereof, thence longitudinally along the plate at the latter named side, thence through the second opening to and along the first named side of the plate, and thence through the third opening toward the second named side of the plate, and finally the bight or looped portion of the threaded end is brought back over and engaged with the said end of the plate and the doubled end of the line, whereby a firm connection between the plate and line is afforded. This leaves the extremity 4 of the line depending for the attachment of the sinker 5, and disposes the sides of the bight or loop in the threaded end of the line seated within the adjacent recesses 3, whereby any tendency of the line to slip is prevented. The hook or hooks 6 are attached to one end of a leader or snood 7, the bight 8 at the opposite end of which is threaded through the opening at the opposite end of the connector plate and extended across said plate seated in the adjacent recess 3, whereby said leader or snood is securely fastened in position. The bight is connected in the manner described with the plate by first passing the bight loop through the plate, then passing the end of the snood carrying the hook or hooks through the same, and then disposing the loop as described and drawing the snood tight, rendering it impossible for the snood or leader to become casually unfastened. When the line is in use the weight of the sinker tends to draw the rear end of the plate downward and to project the forward end of the plate upward, thereby keeping the snood or leader away from the line and preventing it from becoming entangled therewith.

It will of course be understood that the connector may be shifted along the line as occasion requires, and may be easily applied and removed, and that at any time, when the line is in use and a strike is made and the fish swallows or gorges the hook so that it can not be conveniently removed, the connector plate may be detached from the line without cutting the latter and a new leader and connector plate applied therewith and the user may continue fishing.

The device may be used for drop, pole or set lines.

I claim:—

As a new and improved article of manufacture, a connector for fishing lines and hooks, the same comprising a comparatively long and narrow flat plate, having all of its portions lying in the same plane, said plate being provided with a plurality of at least four openings arranged centrally along the length thereof in equidistant relation to each other, the longitudinal side edges of said plate being scalloped or fluted to provide recesses, said recesses being arranged in transversely alined pairs arranged in alternation with said openings.

In testimony whereof I affix my signature in presence of two witnesses.

SEBASTIAN FORSTER.

Witnesses:
ANDREW KENNEY,
CAPUS A. DONLON.